United States Patent [19]

Maetani

[11] Patent Number: 4,566,654

[45] Date of Patent: Jan. 28, 1986

[54] WEB TRANSPORT DEVICE

[75] Inventor: Masami Maetani, Ohmiya, Japan

[73] Assignee: Canon Kabushiki Kaisha, Tokyo, Japan

[21] Appl. No.: 634,440

[22] Filed: Jul. 26, 1984

[30] Foreign Application Priority Data

| Jul. 28, 1983 | [JP] | Japan | 58-138166 |
| Jul. 28, 1983 | [JP] | Japan | 58-138167 |
| Jul. 28, 1983 | [JP] | Japan | 58-138168 |
| Jul. 28, 1983 | [JP] | Japan | 58-138169 |
| Jul. 28, 1983 | [JP] | Japan | 58-138170 |

[51] Int. Cl.⁴ .................... G03B 1/04; G11B 15/32
[52] U.S. Cl. .................... 242/204; 360/74.1; 360/96.3
[58] Field of Search ............ 242/201–204, 242/75.4, 76; 226/111, 113, 24, 29, 38, 196, 189; 360/74.1, 74.2, 74.3–74.5, 96.3; 352/159

[56] References Cited

U.S. PATENT DOCUMENTS

| 2,553,898 | 5/1951 | Debrie | 226/189 |
| 3,006,566 | 10/1961 | Loewe | 242/204 |
| 3,072,309 | 1/1963 | Hill | 226/196 X |
| 4,079,899 | 3/1978 | Vogel | 242/192 |

Primary Examiner—Leonard D. Christian
Attorney, Agent, or Firm—Fitzpatrick, Cella, Harper & Scinto

[57] ABSTRACT

A web transport device transports a web wound on one shaft to the other shaft by rotatively driving the shaft on the take-up side and causing the shaft on the supply side to be driven. When it is desired to stop the feeding of the web, a brake is applied to the shaft on the take-up side and the shaft on the supply side and during the braking, the brake applied to the shaft on the supply side is temporarily released for a predetermined time, whereby slack of a predetermined amount or more is formed in the web between the two shafts. To prevent the instability of the stopped position caused by the formation of such slack, web guide members adapted to bear against the web are provided along a web feeding path.

18 Claims, 19 Drawing Figures

WEB TRANSPORT DEVICE

BACKGROUND OF THE INVENTION

1. Field of the Invention

This invention relates to a web transport device for transporting a web wound on a shaft on the supply side to a shaft on the take-up side, and in particular to a device for controlling the braking of the web.

2. Description of the Prior Art

In a searching device for effecting an information search by the use of a microfilm on which marks are provided for locating a desired image on the film, the film is drawn out from a cartridge containing therein a supply reel on which the microfilm is wound in the form of a roll, the leading end of the film is wound onto a take-up reel and the take-up reel is rotatively driven by a motor while the supply reel is fiollow-up-driven, whereby the film is fed from the cartridge to the take-up reel (this will hereinafter be referred to as forward feed), and the supply reel is rotatively driven by a motor while the take-up reel is follow-up-driven, whereby the film is fed from the take-up reel to the cartridge (this will hereinafter be referred to as reverse feed).

In such a searching device, to locate a frame of the film in which a desired image is recorded, the film is fed at a high speed in the forward feed direction or in the reverse feed direction, marks on the film are optically detected by a mark detector, the mark detection signals put out by the mark detector when it detects the marks are counted by a counter, and when the count value agrees with the address number of the desired frame, a brake is applied to the rotary shaft of a reel on the drive side (the take-up side) and the rotary shaft of a reel on the driven side (the supply side) at a time to stop the film, and the frame which has advanced too much from a predetermined projecting position is returned at a low speed and is stopped at the projecting position.

However, in the above-described high-speed searching, as shown in FIG. 1 of the accompanying drawings, when a film having a total of about 3000 frames has been fed at a high speed from the shaft on the supply side on which the film is wound to the shaft on the take-up side, the number of revolutions per minute $N_1$ of the rotary shaft of the reel on the drive side which takes up the film is almost constant from the point of time whereat the feeding is started till the point of time at which the feeding of the film of 3000 frames is terminated, but the number of revolutions per minute $N_2$ of the rotary shaft of the reel on the driven side which supplies the film is varied about the number of revolutions per minute $N_1$ of the drive side shaft by the variation in the diameter of the film roll on the reel with the vicinity of 1500 frames (the point of time at which one half of the length of the film has been fed) as the boundary. Also, the slack of the film when suddenly stopped from the high speed is represented by curve δ. That is, from the point of time at which the feeding has been started (0 frame) till the point of time at which 1500 frames have been fed, the film is stopped while being subjected to tension and the slack of the film increases remarkably from the vicinity of the point of time at which the number of fed frames exceeds 1500 frames. In the case of a film having a different number of frames (a different full length of film), the number of frames in the vicinity of the point of time at which the slack occurs will differ.

This phenomenon occurs due to the differences in angular speed and inertia force between the shafts on the drive side and the driven side when a brake is applied thereto. This may lead to a serious problem that if the amount of slack δ is smaller than the amount of slack formed by the back-lash of the shaft hole of the reel in the film cartridge on the driven side and the diameter of the film roll on the driven side, the film will vibrate due to the back-lash and, if the marks vibrate on the mark detector, erroneous counting will occur and the desired frame cannot be located.

Therefore, it has been attempted to effect independently the film control with the take-up reel side as the drive side and the control with the supply reel side as the drive side, but the back-lashes of the mechanical inertia system on the supply reel side, the inertia system on the take-up reel side, the shafts and the supply and take-up reels cannot be made equal to one another, and in a different form of cartridge, the difference therebetween is great and therefore, so that controlling stoppage of the film is complicated and difficult.

SUMMARY OF THE INVENTION

It is an object of the present invention to eliminate the above-noted disadvantages and to provide a web transport device which can stop a web fed at a high speed while preventing vibration of the web.

It is another object of the present invention to form a slack of a predetermined amount or more in the web to thereby prevent vibration of the web at a mark detecting position and prevent erroneous counting.

It is still another object of the present invention to adjust the amount of slack of the web created on the driven side when the web is suddenly stopped, to thereby prevent the vibration in the web feeding direction caused by the mechanical back-lash of the drive coupling mechanism.

The present invention is characterized in that when the feeding of the web is to be stopped, a brake is applied to the drive shaft and the driven shaft at a time and during the braking thereof, the brake to the driven shaft is temporarily released for a predetermined time to thereby create a slack in the web.

The present invention is further characterized in that web guide members are provided along a web feeding path to prevent the vibration caused by the formation of the slack and the guide members bear against the web.

The invention will become more fully apparent from the following detailed description thereof taken in conjunction with the accompanying drawings.

DESCRIPTION OF THE PREFERRED EMBODIMENTS

Figure 1:
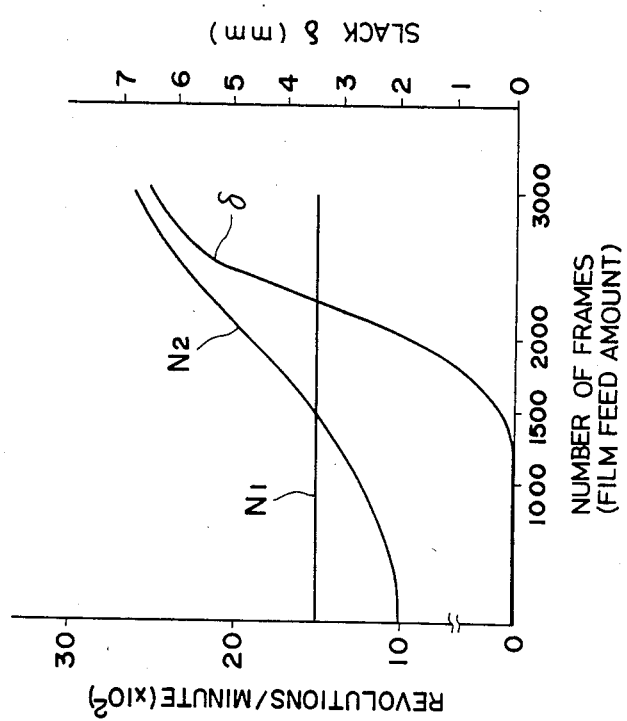
FIG. 1 is a graph showing the relation between the number of frames, the amount of slack of the film and the number of revolutions per minute (rotational speed) of the rotary shaft of the reel.
Figure 2:
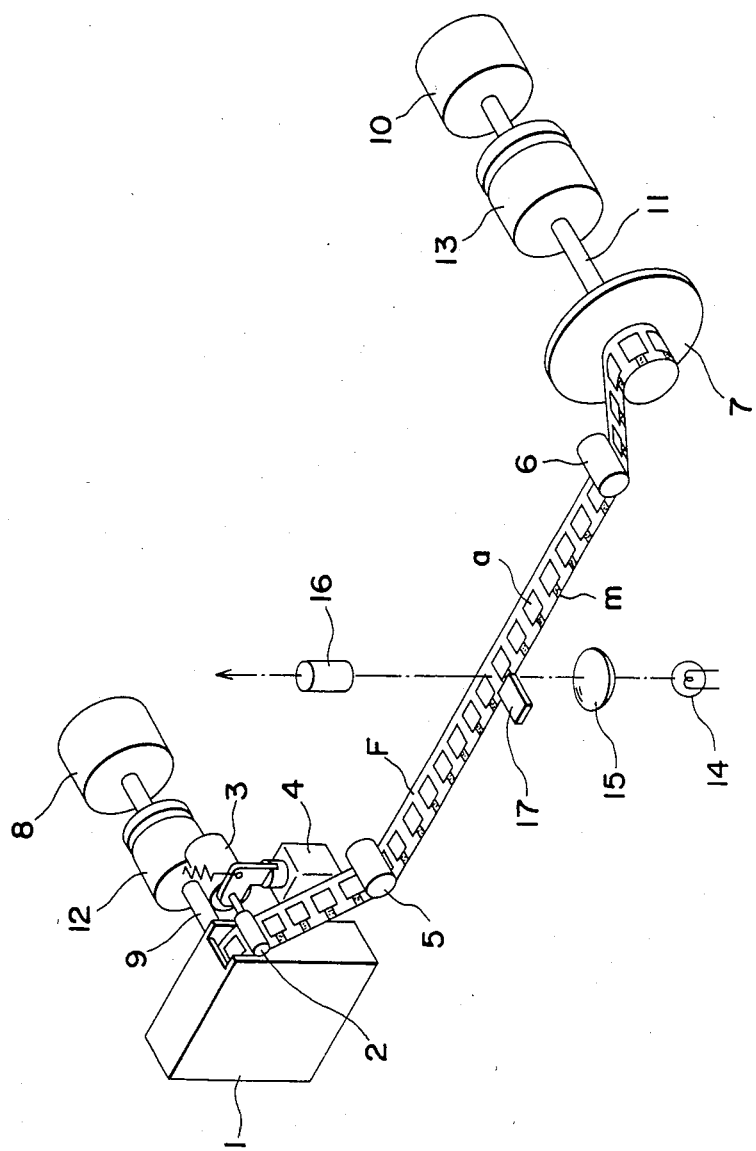
FIG. 2 is a perspective view of the essential portions of a microfilm reader printer to which the present invention is applied.

Referring to FIG. 2 which shows a microfilm reader printer provided with a searching device to which the present invention is applied, reference numeral 1 designates a cartridge containing therein a supply reel (not shown) on which a film is wound in the form of a roll, reference numeral 2 denotes a feeding roller for feeding out the leading end of the film F in the cartridge 1, reference numeral 3 designates a feeding motor for driving the roller 2, reference numeral 4 denotes a solenoid for moving the feeding roller 2 to a position in which it contacts the film and a position in which it is separated from the film, reference numerals 5 and 6 designate film guide rollers, reference numeral 7 denotes a take-up reel, reference numeral 8 designates a reverse feeding motor coupled to the rotary shaft 9 of the supply reel for rewinding the film F into the cartridge 1, reference numeral 10 denotes a forward feeding motor coupled to the rotary shaft 11 of the take-up reel 7 for taking up the film F onto the take-up reel 7, reference numeral 12 designates a first brake (device) for the rotary shaft 9 of the supply reel, and reference numeral 13 denotes a second brake (device) for the rotary shaft 11 of the take-up reel. These brakes 12 and 13 may be of conventional construction such as friction brakes or electric brakes.

The microfilm F in the cartridge 1 is drawn out of the cartridge 1 by the feeding roller 2 driven by the feeding motor 3 and is fed out toward the take-up reel 7. When the fed-out film is automatically wound on the take-up reel 7 rotated by the forward feeding motor 10, the solenoid 4 becomes inoperative and the roller 2 separates from the film while, at the same time, the feeding motor 3 stops. Thereafter, the film F is fed from the cartridge 1 to the take-up reel 7 by the drive of the motor 10.

Reference numeral 14 designates a lamp for illuminating the film, reference numeral 15 denotes a condensing lens, reference numeral 16 designates a projection lens for enlargedly projecting the images of the film illuminated by the lamp 14 onto a screen (not shown), letter m denotes counting marks different in concentration from their surrounding portion and provided at one side edge of each frame a of the film F, and reference numeral 17 designates a mark detector for optically detecting the marks m on the film illuminated by the lamp 14 and converting such detection into an electrical signal.

Figure 4:
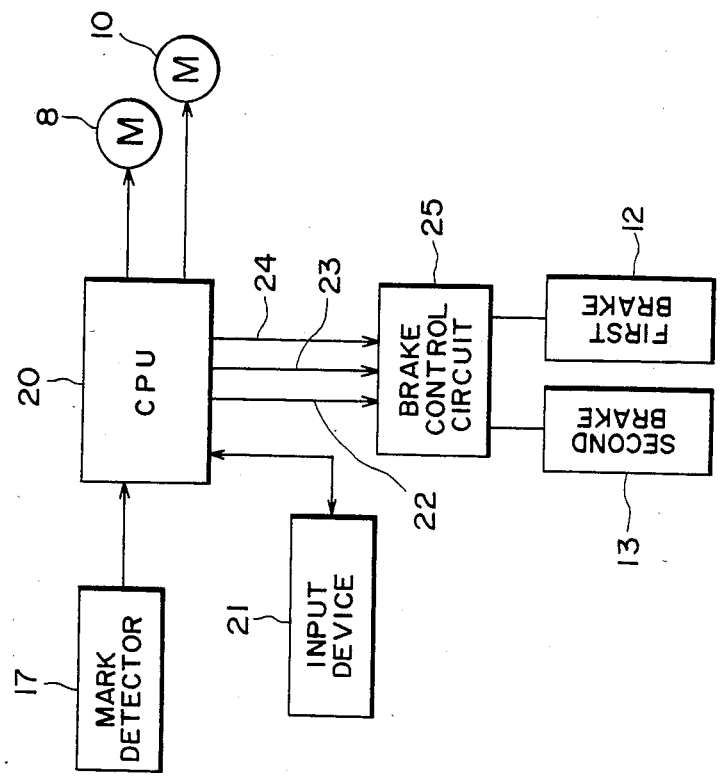
FIG. 4 is a block diagram of the searching device of the present invention.
Figure 3:
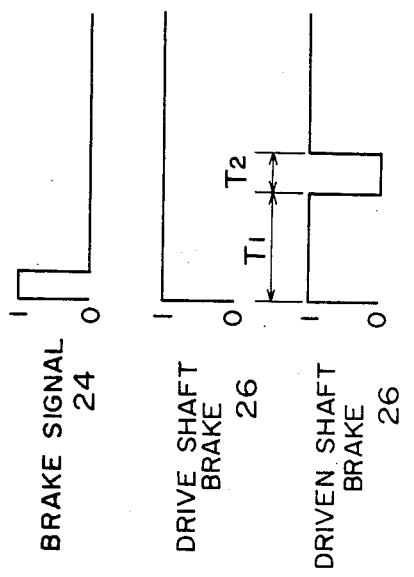
FIG. 3 is a time chart of the brake of the present invention.

FIG. 4 shows a block diagram of the search device which effects the above-described brake control. Signals input to a processing unit (CPU) 20 such as a microcomputer are the mark detection signal from the mark detector 17 and the signal from an input device 21. The frame number of the desired image to be located and other search commands are input from the input device 21. Reference numerals 8 and 10 designate the aforementioned reverse feeding motor and forward feeding motor controlled by the CPU 20, reference numeral 22 denotes a forward feed signal supplied from the CPU, reference numeral 23 designates a reverse feed signal supplied from the CPU, reference numeral 24 denotes a brake signal, and reference numeral 25 designates a brake control circuit for controlling the brakes 12 and 13.

Figure 5:
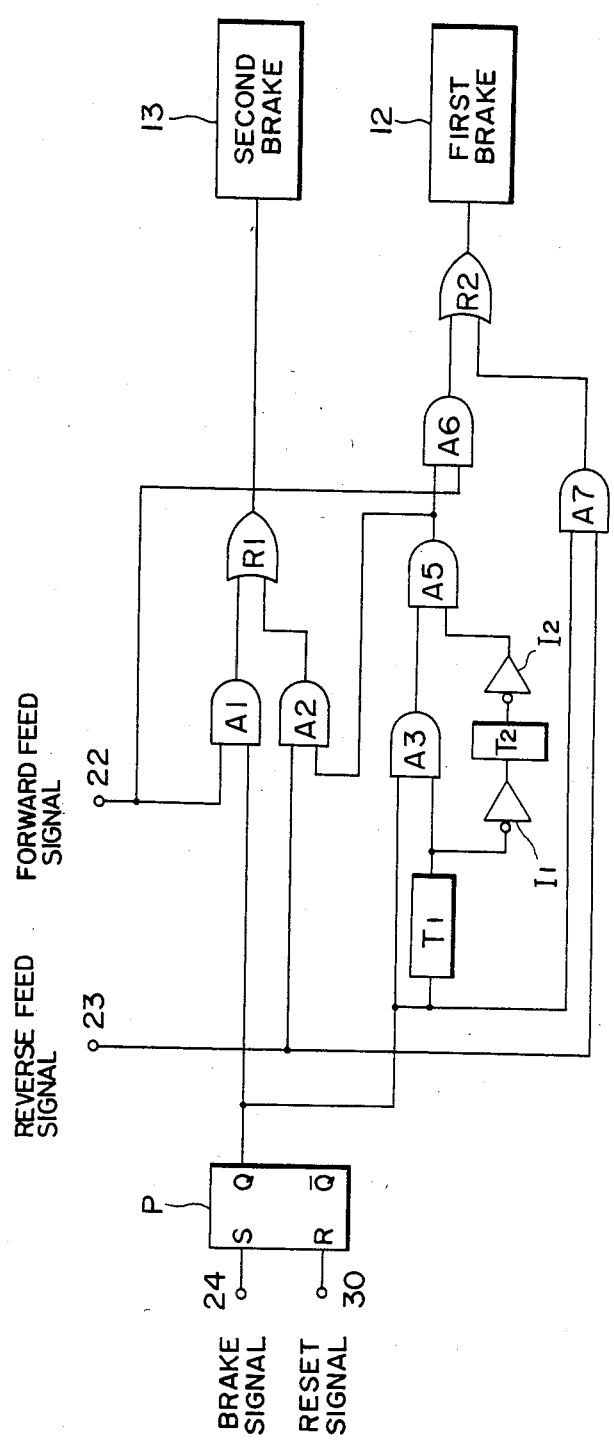
FIG. 5 is a diagram of a brake control circuit.

FIG. 5 illustrates the brake control circuit A1-A3 and A5-A7 designate AND gates, R1 and R2 denote OR gates, I1 and I2 designate inverters, T1 and T2 denote timers, and P denotes a flip-flop which operates as follows.

When the frame number of the desired image to be searched is input to the input device 21, the CPU compares that frame number with the frame number of the previously searched image stored in a counting portion for counting the mark detection signal and judges the forward feed or the reverse feed and revolves the forward feeding motor 10 or the reverse feeding motor 8. If the search is the forward feed search, the motor 10 will be the drive side and the motor 8 will be the driven side.

The film is fed at a high speed, the mark detector 17 detects the mark and the mark detection signal is counted by the counting portion of the CPU 20 and if the count number agrees with the numerical value of the input desired frame number, the brake signal 24 is supplied at "1" from the CPU to the terminals S of the flip-flop P of the brake control circuit 25. At the same time, a motor stop signal is put out from the CPU to stop the revolution of the motor 10 or 8.

The output Q of the flip-flop P assumes a high level or logic "1" (hereinafter simply referred to as "1"), which is supplied to the AND gate A1. Since the forward feed signal 22 of "1" is applied to the AND gate A1, a signal is put out from the OR gate by the output of the AND gate A1 and the second brake 13 for the shaft of the drive motor 10 is operated to apply a brake to the shaft 11.

The output "1" of the flip-flop P is input also to the AND gate A3 and the timer T1, and the timer T1 starts operating and the output thereof provides one input of the AND gate A3 and a signal is supplied to the next AND gate A5. During the operation of the timer T1, the output of the inverter I1 assumes a low level or logic "0" (hereinafter simply referred to as "0") and therefore, the input of the timer T2 becomes "0" and thus, the timer T2 does not operate and therefore, the output of the timer T2 provides the other input of the AND gate A5, from which one input signal is supplied to the next AND gate A6.

Since the forward feed signal 23 is applied to the other input of the AND gate A6, the first brake 12 for the shaft 9 of the driven side motor 8 is operated through the OR gate R2 and applies a brake to the shaft 9. The brakes 12 and 13 are operated at a time.

When the timer T1 becomes OFF after a predetermined time T1, the timer T2 starts operating by the inverter I1 and puts out "1". "0" inverted by the inverter I2 is input to one input of the AND gate A5 and the output of the AND gate A5 is "0" for the operation time T2 of the timer T2 and therefore, the first brake 12 on the driven side is deenergized and becomes inoperative. When the timer T2 becomes OFF, "1" is input to the AND gate A5 and the first brake 12 on the driven side is again operated.

Figure 6:
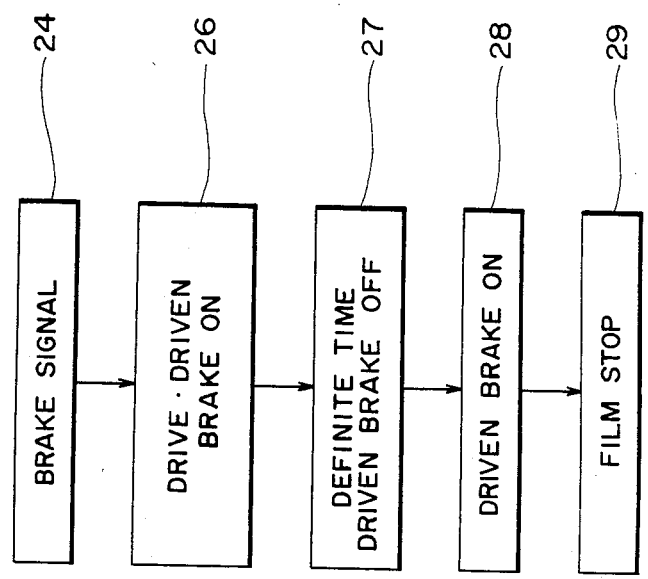
FIG. 6 is a flow chart of the brake operation.

That is, the operation shown in the time chart of FIG. 5 and the flow chart of FIG. 6 is effected.

In the case of the reverse feed search, "1" is input as the reverse feed signal 23 from the CPU to the AND gates A2 and A7. Since the output of the AND gate A5 is input to the AND gate A2, the brake 13 operates as the driven side for the timer of the timer T1 and is inoperative for the time of the timer T2 and again operates. The input of the AND gate A7 comprises the output Q of the flip-flop P and the reverse feed signal 23 and therefore, the output of the AND gate A7 becomes "1" and the brake 12 becomes the drive side and continuedly operates.

The brake operates until a reset signal 30 is input to the terminal R of the flip-flop P. The reset signal may be supplied in response to the start of the next searching operation.

According to the present invention, as described above, the brakes are operated on the drive side and the driven side at a time when the microfilm is rapidly searched and suddenly stopped, and the brake on the driven side is rendered inoperative for the time $T_2$ and is again operated when the time $T_1$ has passed, whereby a predetermined slack can be created when the film is stopped. The amount of this slack may be controlled so as to be greater than the amplitude of the vibration caused by the back-lash of the supply reel in the cartridge, whereby the aforementioned erroneous search is prevented.

Also, in making the lower limit of the slack greater than the maximum amplitude of the vibration caused by the back-lash of the mechanical system which occurs when the film is stopped, as described above, the amount of the slack is adjusted by the driven side brake control times $T_1$ and $T_2$. Accordingly, high-speed search can be accomplished by being adjusted so as to be adapted even for a case where the back-lash of the mechanical system differs or a different form of cartridge is used. Further, the inertia systems on the supply side and the take-up side may differ from each other in some cases between the forward feed search and the reverse feed search, and in such cases, the aforementioned control times $T_1$ and $T_2$ are suitably varied.

Figure 7:
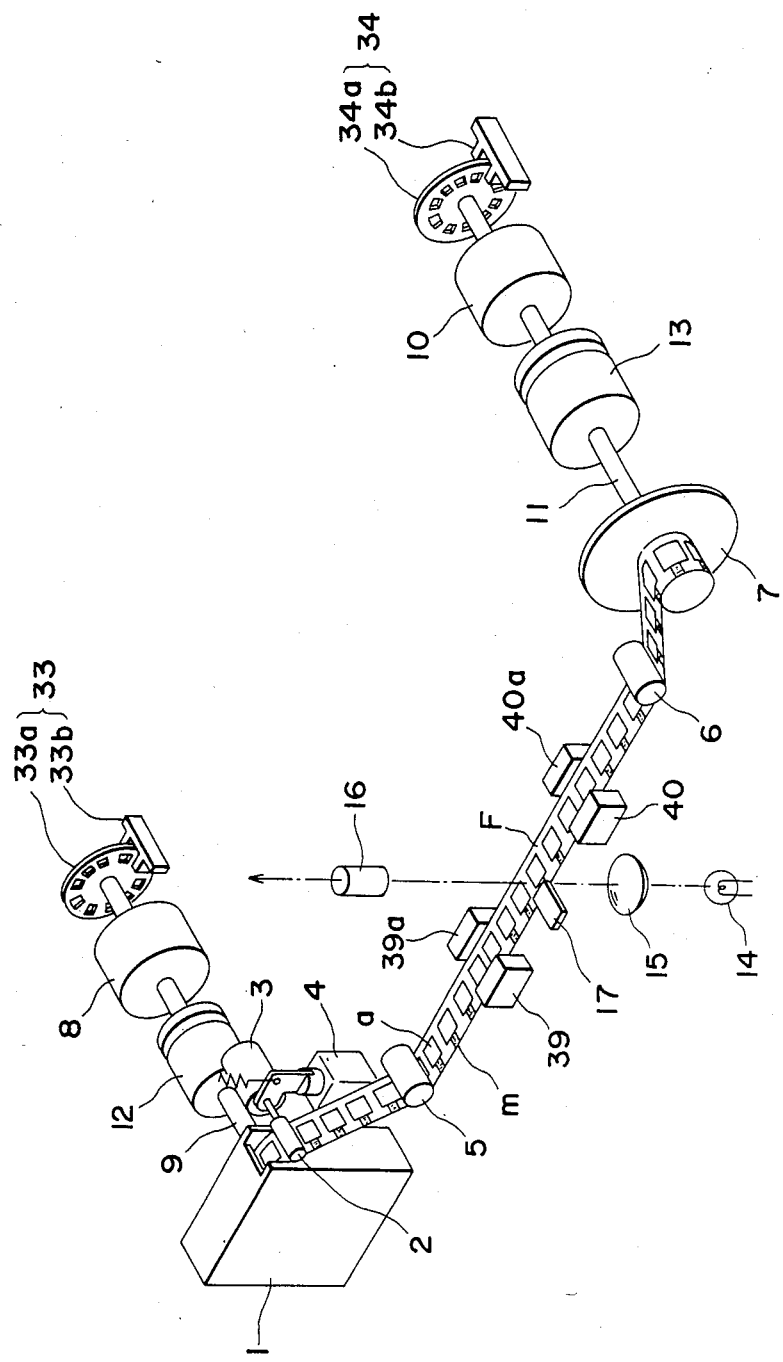
FIG. 7 is a perspectivwe view of the essential portions of a microfilm reader printer according to another embodiment of the present invention.

FIG. 7 shows another embodiment of the present invention. In FIG. 7, parts similar to those of the previous embodiment are given similar reference numerals.

In the embodiment of FIG. 2, the brake is controlled so as to create a slack greater than the length pulled by the back-lash of the driven side reel, but the stopped position of the film becomes unstable due to the vibration of the film caused by the slack, and this leads to the possibility of causing the mark detector 17 to effect erroneous counting.

To eliminate such possibility, in FIG. 7, friction guide members 39, 39a, 40 and 40a adapted to bear against the opposite side edges of the film F are provided before and behind the mark detector 17 with respect to the direction of film feeding.

Figure 12:
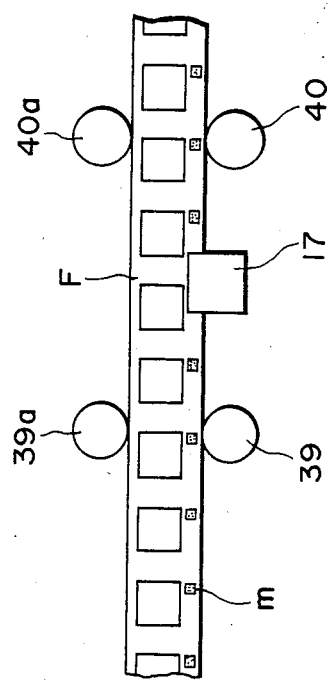
FIGS. 12 and 13 show further embodiments of the friction guide members.

To ensure that said friction guide members bear against the opposite side edges of the film, the interval between each pair of opposed friction members 39 and 39a, 40 and 40a is made slightly narrower than the width of the film F. The shape of these friction members may be arbitrary, namely, a planar shape as shown in FIG. 7 or a pillar-like shape as shown in FIG. 12, and the material thereof may be a highly wear-proof material such as stainless steel or ceramics.

With such a construction, even if there is the vibration by the aforementioned slack, the portion of the film between the friction guide members 39, 39a and 40, 40a, namely, the portion of the film before and behind the mark detector 17, is stopped at a stable position without being affected by the vibration and the erroneous counting by the mark detector is prevented. Also, the friction guide members act on the side edges of the film and therefore do not impart any damage to the images of the film.

Even if the stopped position of the film is stable as described above, there is sometimes a problem in the posture of the film relative to the mark detector 17.

Figure 14:
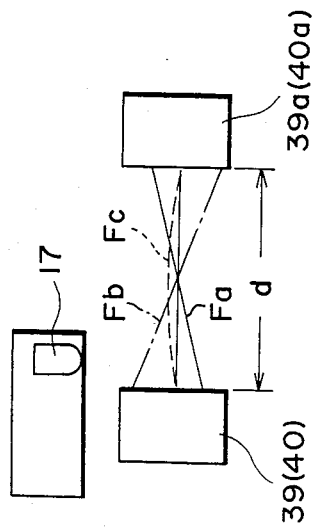
FIG. 14 illustrates the action of the friction guide members.

That is, as shown in FIG. 14, the film stops in one of postures Fa, Fb and Fc because the interval d between the friction guide members is narrower than the width of the film. Therefore, if the mark detector 17 is of the optical type, an error may arise in the relative position of the marks m on the film and the gain of the sensor (photoelectric conversion element) constituting the mark detector may vary greatly and it may become impossible for the mark detector to count the marks.

Figure 13:
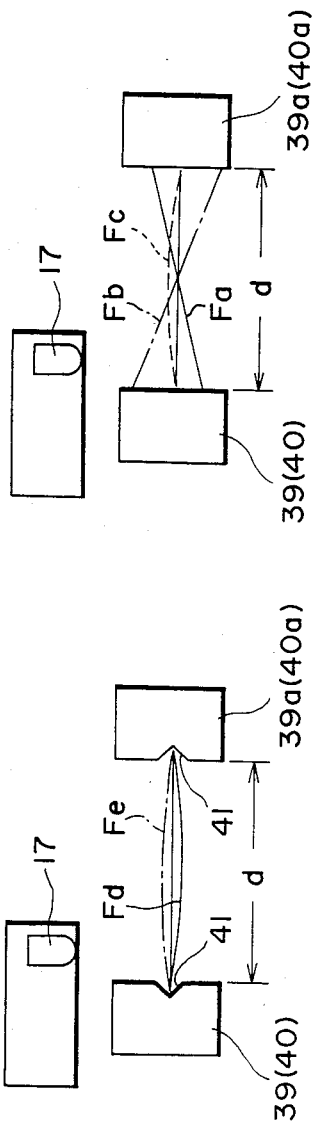

To eliminate such undesirable possibility, if a groove 41 for receiving the side edge of the film is provided in the surface of each friction guide member which bears against the film, as shown in FIG. 13, the film will assume one of postures Fd and Fe. The maximum width between the opposed grooves 41 is slightly narrower than the width of the film.

Accordingly, the variation in the gain of the sensor becomes very small and the undesirable possibility of mark detection becoming impossible is eliminated. The grooves 4 may preferably be V-shaped, as shown.

FIGS. 8–11 show another embodiment of the brake control device. When a desired frame is detected, the brake signal 24 is produced by the CPU 20 in FIG. 9 as in the previous embodiment and applies a brake to the drive shaft and the driven shaft at a time. When the speed of rotation (angular speed) of the drive shaft reaches its set value during the braking, the brake to the driven shaft is temporally released for the time $T_2$ and the brake is again applied to the driven shaft, whereby the brake is controlled so that the slack δ of the film may not be smaller than said maximum amplitude. In FIGS. 8–11, parts functionally similar to those in FIGS. 2–6 are designated by similar reference numerals.

Figure 9:
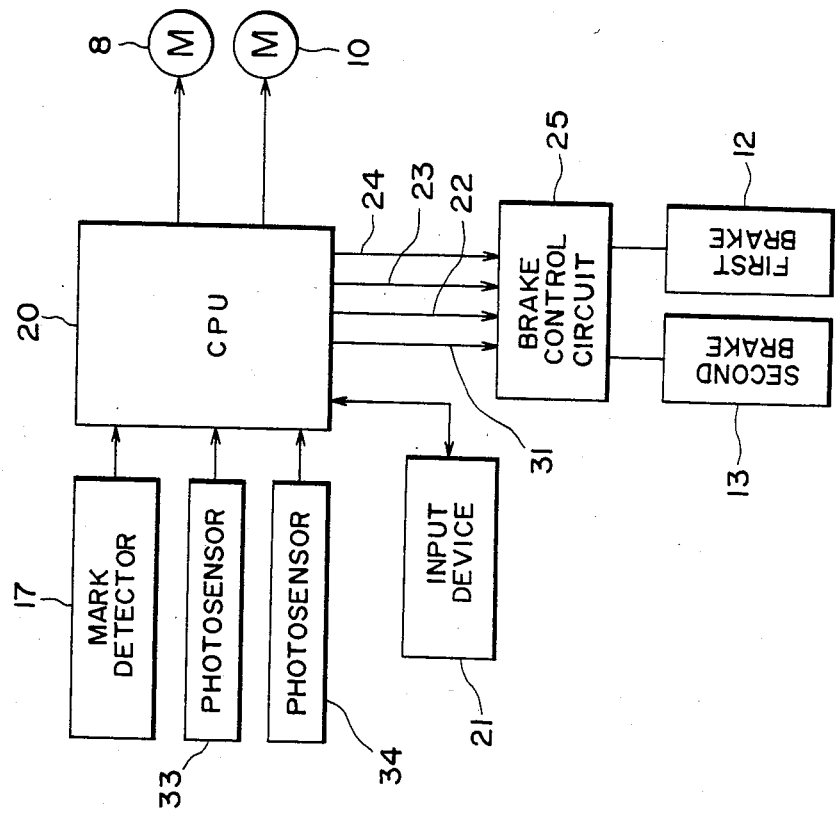
FIGS. 8 to 11 are views of said another embodiment corresponding to FIGS. 3 to 6.

To obtain the signal of said set speed of rotation, apertured or toothed disks 33a and 34a and photosensors 33 and 34 each comprising a light-emitting element 33b and a light-receiving element 34b are provided on the shafts of the motors 8 and 10, respectively, and a pulse signal is taken out therefrom and input to the CPU 20 of FIG. 9.

Figure 10:
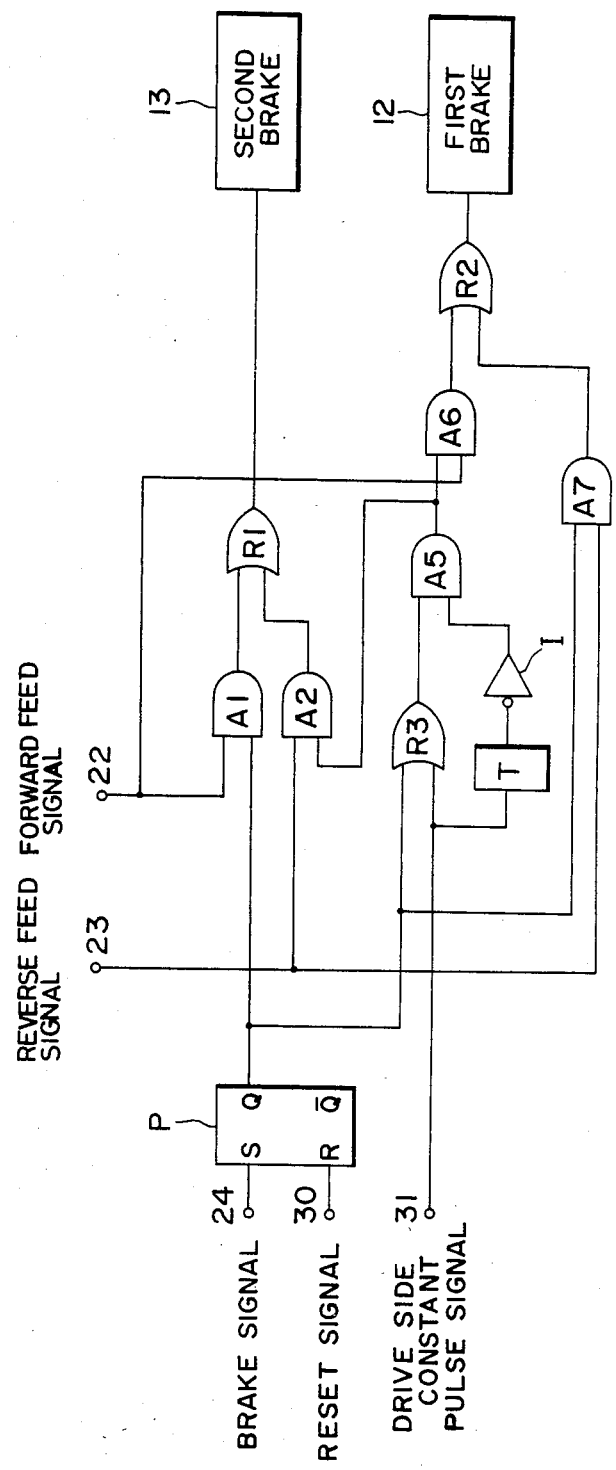

In the same order as in the previous embodiment, the brake signal 24 which is "1" is supplied from the CPU to the terminal S of the flip-flop P of the brake control circuit 25 of FIG. 10.

The "1" from the output Q of the flip-flop P is supplied to the AND gate A1. Since the forward feed signal 22 which is "1" is applied to the AND gate A1, a signal is put out from the OR gate R1 by the output of the AND gate A1 and operates the second brake 13 for the shaft 11 of the driving side motor 10 to apply a brake to the shaft 11.

The output "1" of the flip-flop P is input to one input of the AND gate A5 through the OR gate R3. Since the set rotational speed signal 31 is "0", the timer T does not operate. The "1" inverted by the inverter I provides one input of the AND gate A5 and a signal is supplied to the next AND gate A6, which in turn supplies a signal to the OR gate R2 by the forward feed signal 22. Accordingly, the first brake 12 on the driven side operates simultaneously with the second brake 13.

When the revolution of the drive side motor 10 is decelerated and the number of pulses generated from a photosensor 33 for a predetermined time is coincident with the number preset in the CPU 20, the signal 31 is supplied to a control circuit 25 and the timer T starts operating. The output "1" thereof is inverted into "0" by the inverter I, and the output of the AND gate A5 becomes "0" and the first brake 12 on the driven side becomes inoperative.

When the set time $T_2$ of the timer T is up, the second brake 12 on the driven side operates again. The operation of the brakes 12 and 13 continues until a reset signal 30 is input.

Figure 8:
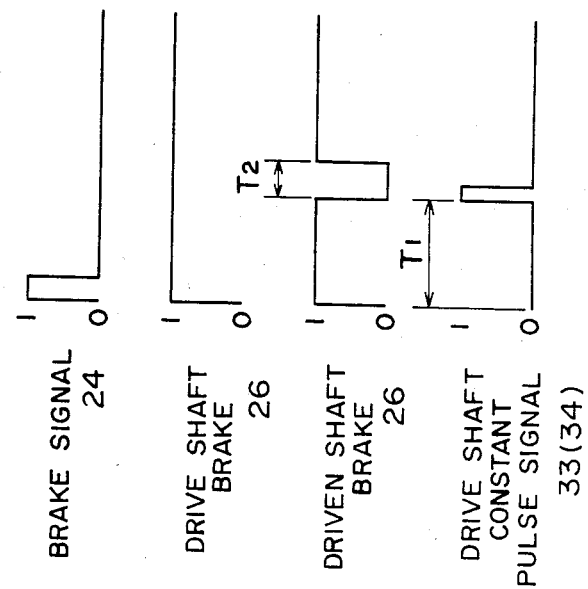
Figure 11:
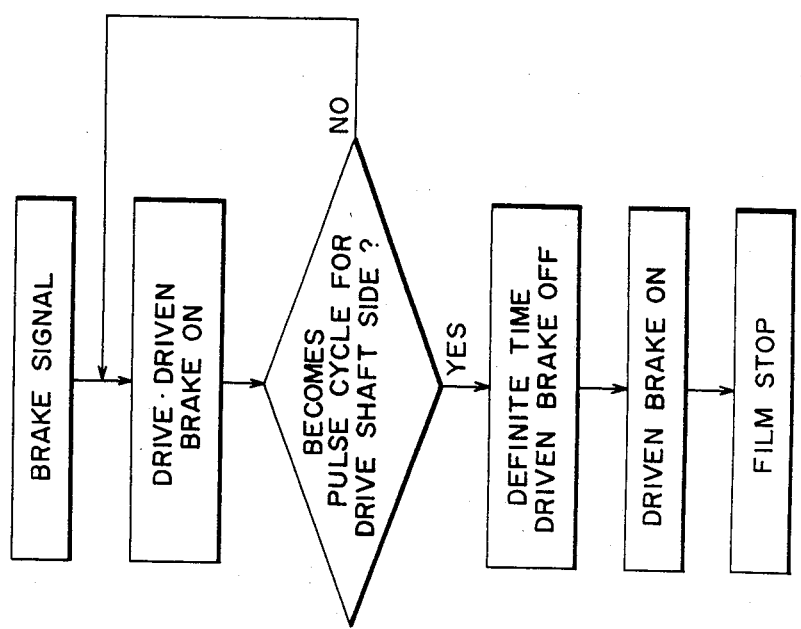

FIG. 8 is the time chart of the brake control device of FIG. 7, and FIG. 11 shows the flow chart thereof.

In the case of the reverse feed search, the reverse feed signal 23 and brake signal 24 enter the AND gate A7 and continuedly operate the brake 12 of the motor 8 which has become the drive side through the OR gate R2 until the reset signal 30 enters the brake 12. The reset signal may be supplied in response to the start of the next searching operation.

On the other hand, the brake 13 of the motor 10 which has become the driven side inputs the output "1" of the AND gate A2 to the OR gate R1 by the signal 23→A2, the signal 24→R3→A5 and the signal T→I→A5→A2, and starts operating simultaneously with the brake 12.

The number of revolutions of the drive side motor 8 assumes a set value, the time T is operated by the signal 31, and the driven side brake 13 once becomes inoperative by the signal "0" to the AND gates A5 and A2 and again operates after the set time $T_2$.

In the manner as described above, brake control is effected when the film is stopped and the film slack $\delta$ created on the driven side is adjusted by empirically setting the timing at which the driven side brake is temporarily paused and the temporary pause time $T_2$ with the physical condition such as the inertia on the supply side 1 and the take-up side 7, the form of the cartridge reel, the brake performance, etc. taken into consideration.

By the construction of FIG. 7, the vibration on the mark detector can be prevented when the film is stopped. However, the diameter of the roll film varies by about $\phi 40-\phi 80$ and therefore, the torque on the drive side varies by about $\frac{1}{2}$. Therefore, the friction guide members provide a load during the feeding of the film and the irregularity of the time during low speed running varies greatly depending on the diameter of the roll film and this may lead to a lengthened search time.

Also, the interval d between the friction guide members is narrower than the width of the film as previously described and therefore, in the case of a cartridge which does not use an exclusive leader tape, the auto-loading of the film is difficult. Or an inconvenience such as a load imparted to the feeding of the film occurs when the frames having overrun after the film has been stopped are rewound.

Figure 15:
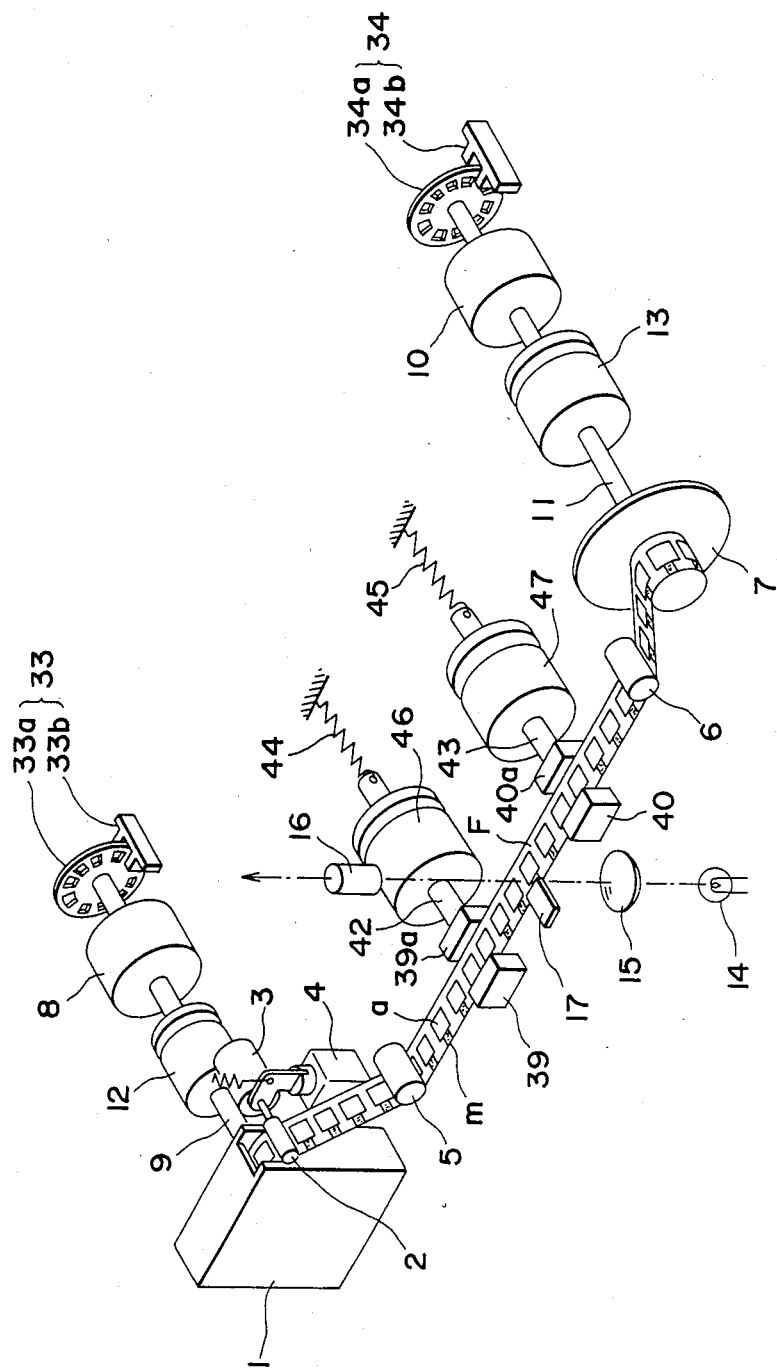
FIG. 15 is a perspective view of the essential portions of a microfilm reader printer according to still another embodiment of the present invention.

Therefore, to eliminate such inconvenience, as shown in FIG. 15, one of the pairs of friction guide members 39 and 39a, 40 and 40a, for example, the pair of friction guide members 39a and 40a, are supported by support rods 42 and 43, respectively, and are normally pulled by pull springs 44 and 45 to widen the interval d between the opposed friction guide members 39 and 40 and keep these friction guide members in an inoperative position in which they do not contact the film. Designated by 46 and 47 are solenoids. Energization of these solenoids advances the support rods 42 and 43 against the forces of the springs to keep the friction guide members 39a and 40a in an operative position in which they contact the side edges of the film.

Figure 16:
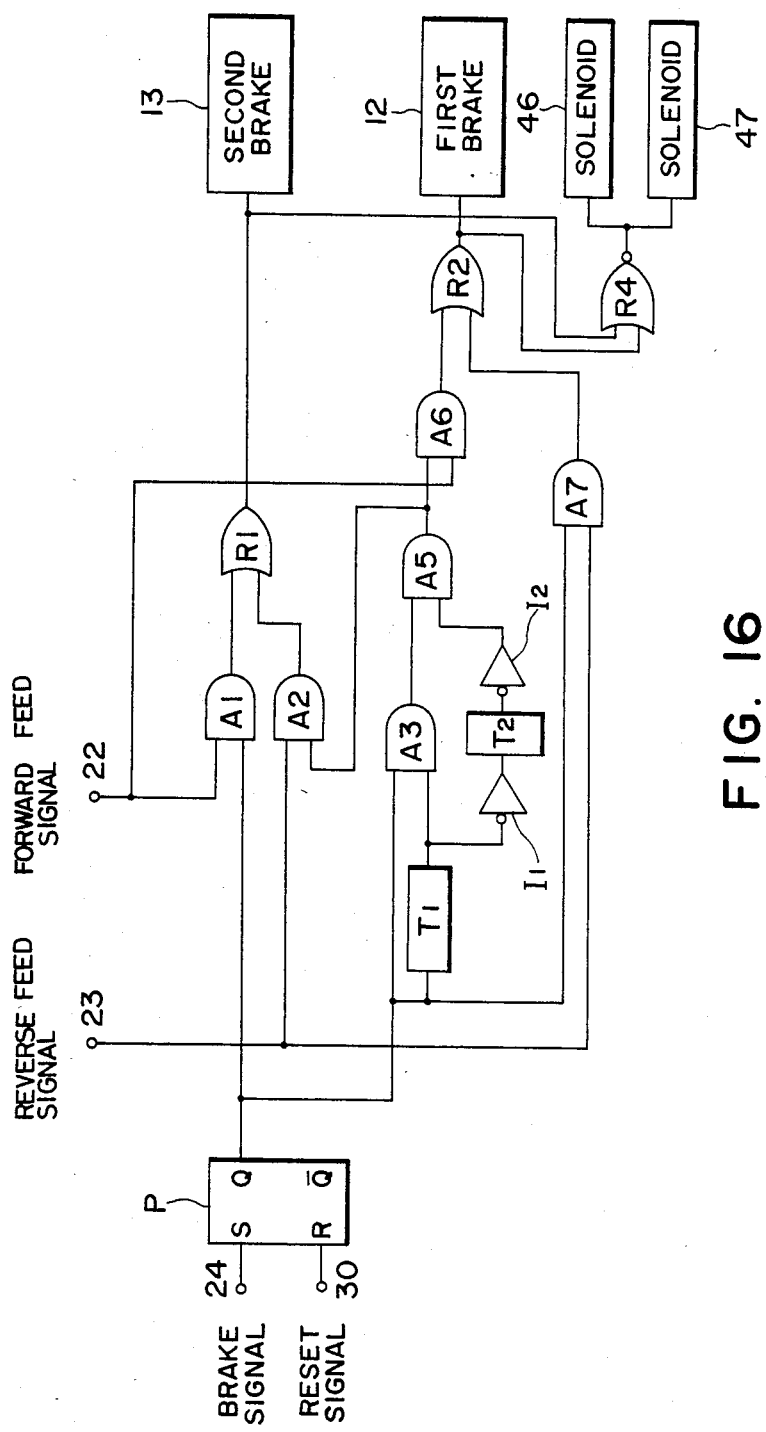
FIG. 16 is a diagram of a brake control circuit of said still another embodiment.

As shown in FIG. 16, the solenoids 46 and 47 are connected to the signal circuits of the brakes 12 and 13 through a NAND gate R4, whereby during the operation of the driving side brake 12 (or 13), electric power is supplied to the solenoids 46 and 47 to cause the friction guide members 39, 39a, 40 and 40a to act on the side edges of the film.

Thus, the friction guide members act on the film only during the braked decelerated feeding of the film, and the aforementioned inconveniences during the high speed search movement, during the auto-loading of the film and during the rewinding of the overrunning frames are eliminated.

Figure 18:
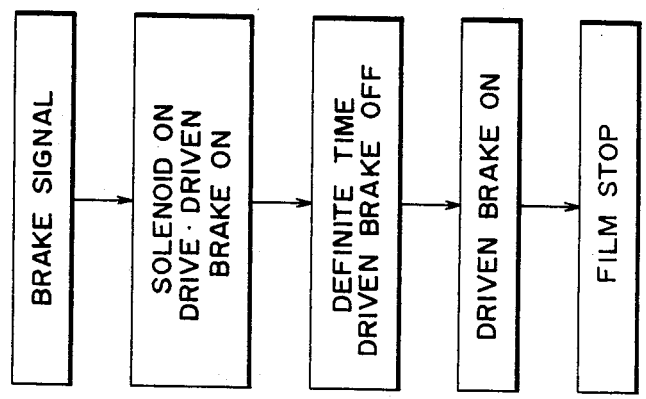
FIG. 18 is a flow chart of the brake operation.
Figure 17:
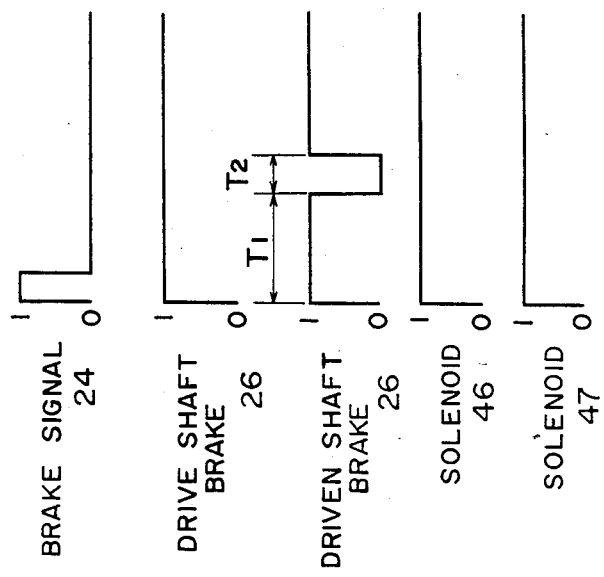
FIG. 17 is a time chart of the brake.

FIG. 17 is the time chart of the brake control device of FIG. 15 and FIG. 18 is the flow chart thereof.

Figure 19:
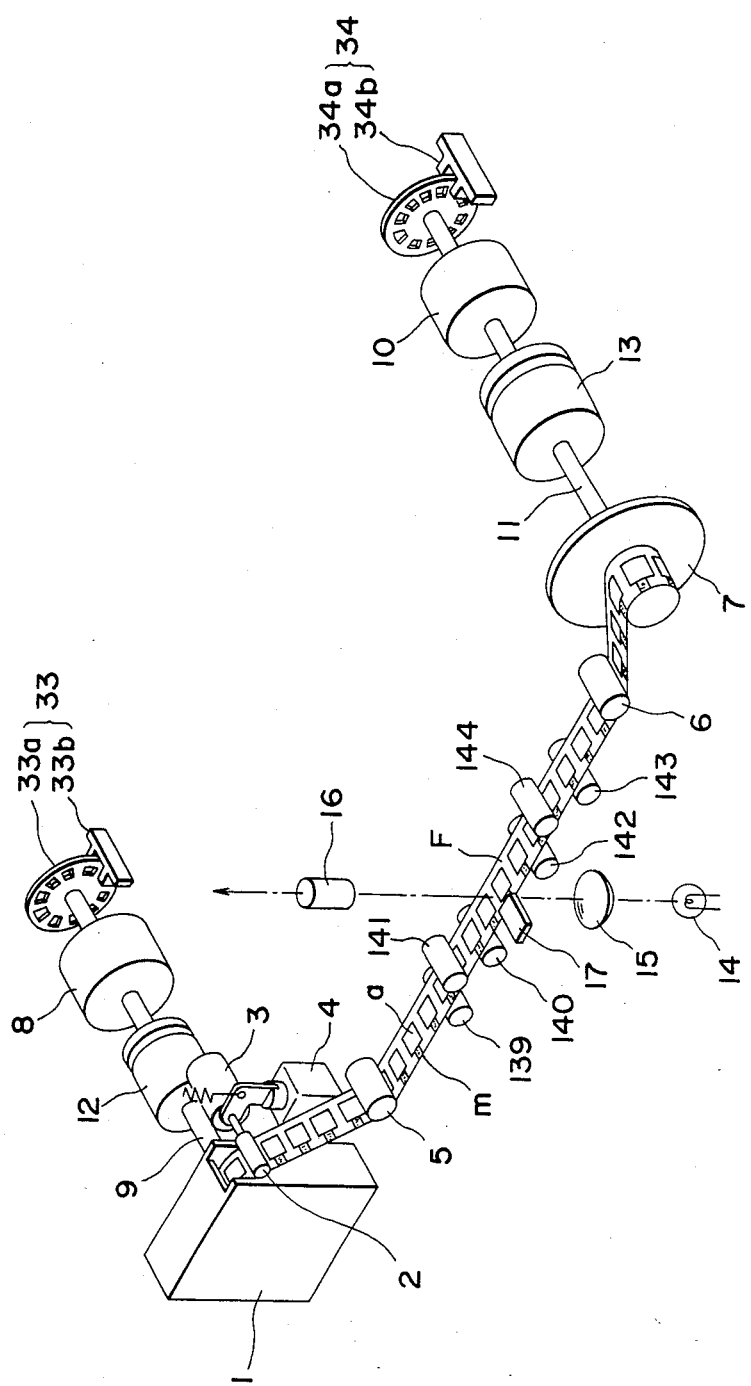
FIG. 19 is a perspective view of the essential portions of a microfilm reader printer according to a further embodiment of the present invention.

FIG. 19 shows another embodiment for preventing the vibration of the film caused by the formation of slack. Members for imparting tension to the film are provided before and behind the mark detector 17. In the embodiment of FIG. 19, as such members, rotatable rollers 139, 140, 142 and 143 are provided at the left and right of the mark detector 17 below the film F, and between these rollers, rotatable rollers 141 and 144 are provided above the film in staggered relationship with the rollers 139, 140, 142 and 143 so that the lower surfaces of the rollers 141 and 144 underlie the tangential line of the rollers 139, 140, 142 and 143, and the film may be undulatingly guided in the direction of feeding by these rollers. As required, each of the rollers 139-144 may be divided into two so as to contact the side edge portions of the film which are off the image-bearing portion of the film, or the portion of each of these rollers which faces the image-bearing portion of the film may be made to have such a small diameter that it does not contact the film.

With the above-described construction, even if the film is vibrated by the formation of the aforementioned slack, the film is subjected to the tensile action by the rollers 139, 140, 141, 142, 143 and 144 arranged in staggered relationship before and behind the mark detector 17 and the vibration of the film is not propagated and therefore, the film is immediately stopped properly on the mark detector, whereby erroneous counting is prevented.

I claim:

1. A web transport device for transporting a web wound on a supply shaft to a take-up shaft, comprising:
   drive means for rotating said take-up shaft for transporting the web to said take-up shaft;
   first brake means for stopping rotation of said supply shaft;
   second brake means for stopping rotation of said take-up shaft; and brake control means for controlling said first brake means and said second brake means, wherein said brake control means operates both said first and second brake means, thereafter renders said first brake brake means inoperative for a predetermined time and then operates said first brake means again, so that the web can be stopped while providing slack in the web between said supply shaft and said take-up shaft.

2. A web transport device according to claim 1, further comprising sensing means for detecting when said take-up shaft assumes a predetermined rotational speed, wherein said brake control means renders said first brake means inoperative in response to an output signal from said sensing means after operation of said first and second brake means.

3. A web transport device according to claim 1, wherein said brake control means includes a timer and the operation of said first brake means is controlled by said timer.

4. A web transport device according to claim 3, wherein said first brake means operates simultaneously with said second brake means, whereafter it becomes inoperative for a time set by said timer, and then operates again.

5. A web feeding device according to claim 1, wherein web guide members are disposed along a web feeding path for contacting the opposite side edges of the web.

6. A web transport device according to claim 5, wherein said web guide members are disposed in opposed relationship with each other with the web transporting path intervening therebetween, and the interval between said opposed web guide members is narrower than the width of the web.

7. A web transport device according to claim 6, wherein each of said web guide members has a V-shaped groove in the portion thereof which is disposed to be opposed to the side edge of the web.

8. A web transport device according to claim 6, further comprising moving means for moving said web guide members between a position in which said web guide members will bear against the side edges of the web and a position in which said web guide members will not bear against the side edges of the web, wherein said moving means moves said web guide members to a selected one of the positions thereof in response to operation of said brake means.

9. A web transport device according to claim 1, wherein web guide members are disposed along a web transporting path for contacting the upper and lower surfaces of the web and guiding the web undulatingly in the transporting direction.

10. A web transport device according to claim 9, wherein said web guide members comprise at least a first roller for contacting the upper surface of the web and a second roller for contacting the lower surface of the web, said first and second rollers being juxtaposed in the transporting direction and disposed in such a relationship that the lowermost surface of said first roller underlies the uppermost surface of said second roller.

11. A searching device for locating a desired image on a web on which a plurality of images and marks corresponding to the images are recorded, said searching device having:
drive means for rotatively driving a take-up shaft to transport the web wound on a supply shaft onto said take-up shaft;
mark detecting means for detecting the marks on the web;
means for counting the marks detected by said mark detecting means and putting out a stop signal when the count value becomes coincident with the address number of the desired image;
first brake means coupled to said supply shaft;
second brake means coupled to said take-up shaft; and
brake control means for intermittently operating said first brake means and continuously operating said second brake means until the web is stopped by said stop signal.

12. A searching device according to claim 11, wherein said brake control means operates said first and second brake means so as to apply a brake to each of said shafts, whereafter it renders said first brake means inoperative for a predetermined time and again operates said first brake means after the lapse of said predetermined time.

13. A searching device according to claim 12, wherein when said take-up shaft assumes a predetermined rotational speed during the operation of said first and second brake means, said first brake means is rendered inoperative for said predetermined time, whereby a slack of a predetermined amount or more is formed in the web.

14. A searching device according to claim 11, wherein said brake control means includes a timer and the operation of said first brake means is controlled by said timer.

15. A searching device according to claim 14, wherein said first brake means operates simultaneously with said second brake means, whereafter it become inoperative for a time set by said timer, and then operates again.

16. A searching device according to claim 11, wherein web guide members are disposed along a web transporting path for contacting the opposite side edges of the web.

17. A searching device according to claim 16, further comprising moving means for moving said web guide members between a first position in which said web guide members will bear against the side edges of the web and a second position in which said web guide members will not bear against the side edges of the web, wherein said moving means moves said web guide members to the second position upon transportation of the web and to the first position upon stopping the web.

18. A searching device according to claim 11, wherein web guide members are disposed along a web transporting path for contacting the upper and lower surfaces of the web and guiding the web undulatingly in the transporting direction.

* * * * *

UNITED STATES PATENT AND TRADEMARK OFFICE
CERTIFICATE OF CORRECTION

PATENT NO. : 4,566,654
DATED : January 28, 1986
INVENTOR(S) : MASAMI MAETANI

It is certified that error appears in the above-identified patent and that said Letters Patent is hereby corrected as shown below:

Column 1, line 18, change "fiollow-up-driven," to --follow-up-driven,--; and
    line 35, change "at a time" to --at the same time--.

Column 2, line 18, delete "and therefore,";
    line 39, change "at a time" to --at the same time--; and
    line 66, change "perspectivwe" to --perspective--.

Column 4, line 14, change "circuit A1-A3" to --circuit 25. A1-A3--;
    line 34, change "supplied at "1"" to --supplied as "1"-- and change "terminals S" to --terminal S--; and
    line 62, change "at a time." to --at the same time.--.

Column 5, line 11, change "the timer of the timer T1" to --the time of the timer T1--.

Column 6, line 36, change "grooves 4 may" to --grooves 41 may--;
    line 41, change "at a time." to --at the same time.--; and
    line 45, change "temporally" to --temporarily--.

UNITED STATES PATENT AND TRADEMARK OFFICE
CERTIFICATE OF CORRECTION

PATENT NO. : 4,566,654
DATED : January 28, 1986
INVENTOR(S) : MASAMI MAETANI

It is certified that error appears in the above-identified patent and that said Letters Patent is hereby corrected as shown below:

Column 9, line 5, delete "brake" (first occurrence).

Column 10, line 40, change "become" to --becomes--.

Signed and Sealed this

Fourteenth Day of October, 1986

[SEAL]

*Attest:*

DONALD J. QUIGG

*Attesting Officer*  *Commissioner of Patents and Trademarks*